(12) United States Patent
Pericevic et al.

(10) Patent No.: US 7,980,366 B2
(45) Date of Patent: Jul. 19, 2011

(54) HYDRAULICALLY ACTUATED MULTI-PISTON DISC BRAKE

(75) Inventors: Aleksandar Pericevic, Munich (DE); Johann Baumgartner, Moosburg (DE); Robert Trimpe, Wessling (DE); Steffen Geissler, Hainburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/756,421

(22) Filed: Apr. 8, 2010

(65) Prior Publication Data

US 2010/0252374 A1  Oct. 7, 2010

Related U.S. Application Data

(63) Continuation of application No. PCT/EP2008/008471, filed on Oct. 8, 2008.

(30) Foreign Application Priority Data

Oct. 9, 2007  (DE) .................. 10 2007 048 350

(51) Int. Cl.
*F16D 55/18* (2006.01)
(52) U.S. Cl. .................. 188/72.4; 188/71.7; 188/73.47; 188/370
(58) Field of Classification Search .................. 188/71.1, 188/71.7, 72.4–72.5, 73.1, 73.46, 73.47, 188/370
See application file for complete search history.

(56) References Cited

U.S. PATENT DOCUMENTS

| 2,961,831 | A | * | 11/1960 | Brueder .................. 60/564 |
| 3,456,766 | A | | 7/1969 | Beller |
| 4,402,336 | A | | 9/1983 | Kalmanczhelyi et al. |
| 5,386,890 | A | | 2/1995 | Itsuaki |
| 6,082,509 | A | * | 7/2000 | Buckley .................. 188/359 |
| 6,761,251 | B1 | | 7/2004 | Wen |
| 2004/0216967 | A1 | * | 11/2004 | Veneziano et al. .......... 188/72.5 |
| 2006/0185942 | A1 | * | 8/2006 | Costa .................. 188/71.1 |
| 2007/0071959 | A1 | | 3/2007 | Okayama |
| 2008/0257660 | A1 | | 10/2008 | Miller |

FOREIGN PATENT DOCUMENTS

| DE | 31 17 815 C2 | 7/1983 |
| DE | 10 2005 049 786 A1 | 4/2007 |
| EP | 1 058 023 A2 | 12/2000 |
| EP | 1 160 477 A2 | 12/2001 |
| JP | 10-196692 A | 7/1998 |

OTHER PUBLICATIONS

German Office Action dated Aug. 20, 2008 including English-language translation (Ten (10) pages).
International Search Report dated Jan. 5, 2009 including English-language translation (Four (4) pages).

* cited by examiner

*Primary Examiner* — Robert Siconolfi
*Assistant Examiner* — Anna Momper
(74) *Attorney, Agent, or Firm* — Crowell & Moring LLP

(57) ABSTRACT

A hydraulically actuated disc brake has at least two hydraulic brake pistons acting upon a brake lining, arranged in a brake housing. The hydraulic disc brake includes a hydraulic synchronization device for reducing oblique wear of the brake lining. The hydraulic synchronization device is interposed between an input pressure line for brake actuation and the brake piston.

8 Claims, 3 Drawing Sheets

HYDRAULICALLY ACTUATED MULTI-PISTON DISC BRAKE

CROSS-REFERENCE TO RELATED APPLICATIONS

This application is a continuation of PCT International Application No. PCT/EP2008/008471, filed Oct. 8, 2008, which claims priority under 35 U.S.C. §119 from German Patent Application No. DE 10 2007 048 350.5, filed Oct. 9, 2007, the entire disclosures of which are herein expressly incorporated by reference.

BACKGROUND AND SUMMARY OF THE INVENTION

The invention relates to a hydraulically actuated disc brake having at least two brake pistons acting upon a brake lining (pad), which pistons are arranged in a brake housing.

Even in the case of disc brakes with two or more brake pistons, oblique wear or circumferential oblique wear of brake linings (pads) can occur, which constitutes a factor limiting the service life of the brake linings. Pneumatically actuated disc brakes with two brake pistons are equipped with a mechanical synchronization of an adjusting movement of the two brake pistons, which are also referred to as actuating rams or adjusting spindles. Such a measure can serve to increase the service life of the brake linings by up to 25%.

Further measures are known for preventing oblique wear in pneumatically applied disc brakes, such as an offset tightening force introduction, for example; a pulled-on brake lining, which carries the disadvantage, however, that the brake caliper has to be dismantled when changing a brake lining, which should not be used for commercial vehicles; and a so-called suspended pressure plate.

All of these approaches to a solution, however, relate to pneumatically actuated disc brakes. No oblique wear reduction by means of synchronized adjustment of the actuating or brake pistons is known to exist for hydraulically actuated multi-piston disc brakes. The oblique wear occurring is a factor in the service life, particularly in the case of commercial vehicle disc brakes with hydraulic actuation.

DE 10 2005 049 786 A1 describes a self-energizing disc brake, in which a stepped piston applies pressure to two actuating pistons in order to vary wedge angles. The dimensions of the step cross sections of the stepped piston are designed so that in conjunction with operating mechanisms they give rise to different displacements of the actuating pistons when the stepped piston is shifted.

The object of the present invention therefore is to improve a hydraulically actuated multi-piston brake so as to minimize the effect of the oblique wear.

The object is achieved by a hydraulically actuated disc brake with at least two brake pistons acting upon a brake lining. The two pistons are arranged in a brake housing. A hydraulic synchronization device for reducing oblique wear of the brake lining is interposed between an input pressure line for brake actuation and the brake pistons.

A hydraulically actuated disc brake according to the invention, having at least two brake pistons acting upon a brake lining, which are arranged in a brake housing, is characterized in that the hydraulically actuated disc brake includes a hydraulic synchronization device for reducing oblique wear of the brake lining. The hydraulic synchronization device is interposed between an input pressure line for brake actuation and the brake piston. Accordingly, no mechanical moving components are needed, such as adjusting screws and associated mechanisms, for example. The hydraulic synchronization device is therefore provided with only a small number of components, for example a stepped piston, which is fitted in the brake housing between the brake pistons.

The hydraulic synchronization device may be fitted at least partially in the brake housing, thereby saving space.

In a preferred embodiment the hydraulic synchronization device is designed with a stepped piston, which includes the following:

(1) at least a first piston face, which can be subjected to an inlet pressure for brake actuation and which is moveably arranged in an inlet pressure chamber; and (2) at least two piston faces for generating an actuating pressure for each of at least two brake pistons, which are each moveably arranged in a corresponding outlet pressure chamber.

The stepped piston is here arranged between the two brake pistons in the brake housing, so that in order to obtain short line distances, that is to say in order to reduce the flow resistances, the outlet pressure chambers of the synchronization connected to the actuating cylinders or pressure chambers of the brake pistons are made to face towards the former. The inlet pressure delivered by the brake master cylinder of the brake system in a brake actuation acts on the first piston face of the stepped piston, which thereupon with its second and third piston faces generates pressures for the respective brake pistons.

In the case of an unevenly worn brake lining, the force begins to build up earlier on the brake piston belonging to the thicker side of the brake lining than on the brake piston belonging to the thinner side of the brake lining, and the rise in pressure in the associated pressure chamber thereby also occurs earlier than on the other chamber, which is associated with the thinner side of the brake lining. In the further course of actuation, different pressures form in the two pressure chambers due to the synchronous actuation of the stepped piston, with the result that actuating force of the piston on the thinner side of the brake lining diminishes and that of the piston on the thicker side is increased. In this way, the wear inside the brake lining is evened out. This unequal distribution of the piston force increases until no further increase in the unequal wear occurs.

In one embodiment, the outlet pressure chambers are advantageously connected to the inlet pressure chamber, in order to afford a wear adjustment or clearance adjustment after brake servicing, a brake servicing piston reset facility, a facility for filling the brake system during initial assembly and brake servicing, and a so-called soft 'knock-back' for preventing DTV, all of which are necessary functions.

In a further embodiment, in a resting position of the stepped piston, the output pressure chambers are interconnected and at least one outlet pressure chamber is connected to the inlet pressure chamber.

The outlet pressure chambers are more preferably still connected to the inlet pressure chamber by way of controllable connections, the controllable connections having at least one valve. This valve may be a pressure-controlled valve, for example one controlled by the inlet pressure.

The valve is more preferably still a remotely controlled valve. This may be actuated by a solenoid, for example. This is a simple way of achieving a continuous synchronization, a suitable wear adjustment, a facility for resetting the piston when servicing the brake, a facility for filling the brake system with hydraulic fluid and a soft 'knock-back'.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
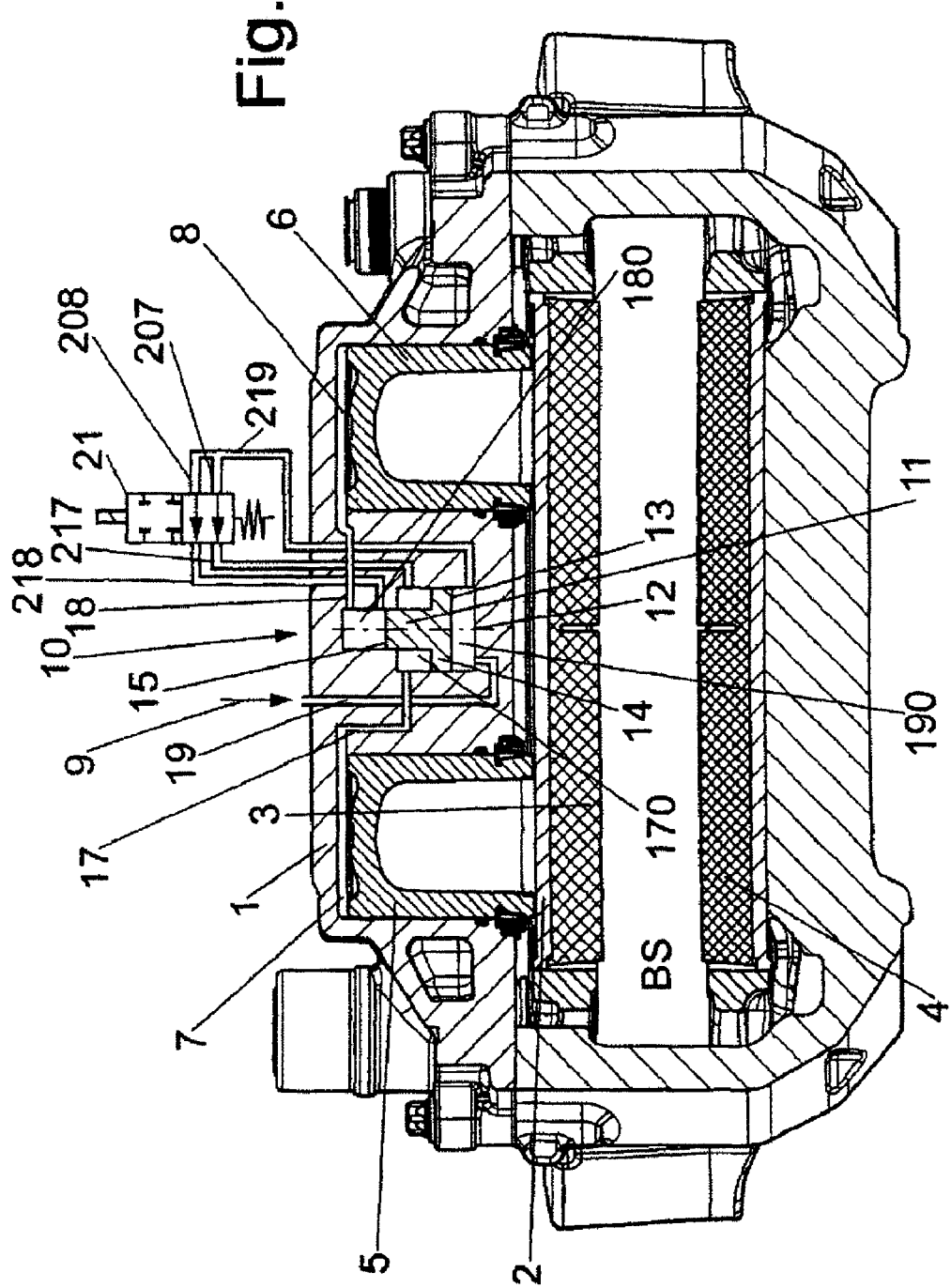
FIG. 1 is a schematic sectional view of a hydraulically actuated multi-piston disc brake with a synchronization device according to the invention.

FIG. 1 shows a schematic sectional view of a first exemplary embodiment of a hydraulically actuated disc brake according to the invention, which has two brake pistons 5, 6 and a synchronization device 10 connected to the pistons on an inlet side.

The brake pistons 5, 6 are arranged in a brake housing/caliper 1 in respective pressure cylinders with pressure chambers 7 and 8. Arranged on their underside shown in FIG. 1 is a brake lining (pad) carrier 2 holding a brake lining 3. A reaction-side brake lining 4 is held possibly by a corresponding carrier in the brake housing 1. A brake disc chamber BS, which is intended for a brake disc (not shown here but readily understood), is arranged between the brake linings 3,4 and surrounded by the brake housing 1, i.e., a caliper.

In this example the synchronization device 10 is arranged in the brake housing 1 between the brake piston cylinders, thereby affording short line distances between the individual pressure chambers.

In this first example, the synchronization device 10 includes a stepped piston 11. A lower, broad section of the stepped piston 11 has an inlet step 12 arranged so that it is displaceable in a chamber in the longitudinal direction of the stepped piston 11. This chamber is divided by the inlet step 12 into two variable pressure chambers. The lower chamber is an inlet pressure chamber 190, which is connected to an inlet pressure line 19. The inlet pressure line 19 is connected, for example, to a brake master cylinder (not shown) of the brake system. The underside of the inlet step 12 of the stepped piston 11 has a first piston face 13. With a second piston face 14, the opposite side faces the upper pressure chamber of the aforementioned chamber. This upper pressure chamber section here forms a first outlet pressure chamber 170, which is connected by a first outlet pressure line 17 to the first pressure chamber 7 of the cylinder of the first brake piston 5.

The inlet step 12 of the stepped piston 11 is connected to an upper, narrower section, which extends into a second outlet pressure chamber 180 and which has an upper side with a third piston face 15. The second outlet pressure chamber 180 is connected by way of a second outlet pressure line 18 to the second pressure chamber 8 of the cylinder of the first brake piston 6.

The synchronization device functions as follows. In the inlet pressure chamber 190, the inlet pressure 9, delivered in this example by the brake master cylinder, acts by way of the inlet pressure line 19 on the first piston face 13 of the stepped piston 11. The second and third piston face 14 and 15 of the stepped piston 11 thereupon generate outlet pressures in the respective outlet pressure chambers 170 and 180, which are fed via the respective outlet pressure lines 17 and 18 to the associated pressure chambers 7 and 8 of the brake pistons 5 and 6.

When the same force-stroke characteristic prevails on both brake pistons 5, 6, as is the case with even and uniformly worn brake linings 3, 4, the outlet pressures for the brake pistons 5, 6 are equal and correspond to the inlet pressure 9. In the event of a brake lining 3 of uneven thickness resulting from circumferential oblique wear, the build-up of force and thereby also the increase in pressure in the associated pressure chamber 7, 8 begins earlier on the brake piston 5, 6, which is located on the thicker side of the brake lining 3, than on the other brake piston 5, 6, which is located at the thinner end of the brake lining 3.

In further actuation of the brake, different pressures form in the pressure chambers 7, 8 of the cylinders of the brake pistons 5, 6 due to the synchronous actuation by the stepped piston 11. The actuating force of the brake piston 5, 6 on the thinner side of the brake lining 3 is reduced, and the actuating force of the brake piston 5, 6 on the thicker side of the brake lining 3 is increased by the same amount. In this way, the wear within the brake lining 3 is evened out. The unequal distribution of the piston force increases until no further increase in the unequal wear occurs. This also applies correspondingly to the opposite brake lining 4. The effects described assume that the pressure chambers 190, 170 and 180 are hermetically separated from one another.

A constant hermetic separation might impair other functions, such as:

(a) wear adjustment or clearance adjustment after brake servicing;

(b) a brake piston reset function for brake servicing;

(c) a function for filling the brake system during initial assembly and brake servicing; and (d) soft 'knock-back' for preventing DTV. Besides fulfilling these necessary functions there is the requirement that a fault or malfunction of the synchronization device 10 must not adversely affect the functioning of the brake. For this reason, in this especially preferred first exemplary embodiment, the inlet pressure chamber 190 is furthermore still connected by an inlet compensation line 219, which branches into a first and second compensation line 207, 208, each by way of a first, remotely controlled valve 21, to the first outlet pressure chamber 170 via a first outlet compensation line 217 and to the second outlet pressure chamber 180 via a second outlet compensation line 218.

Figure 2:
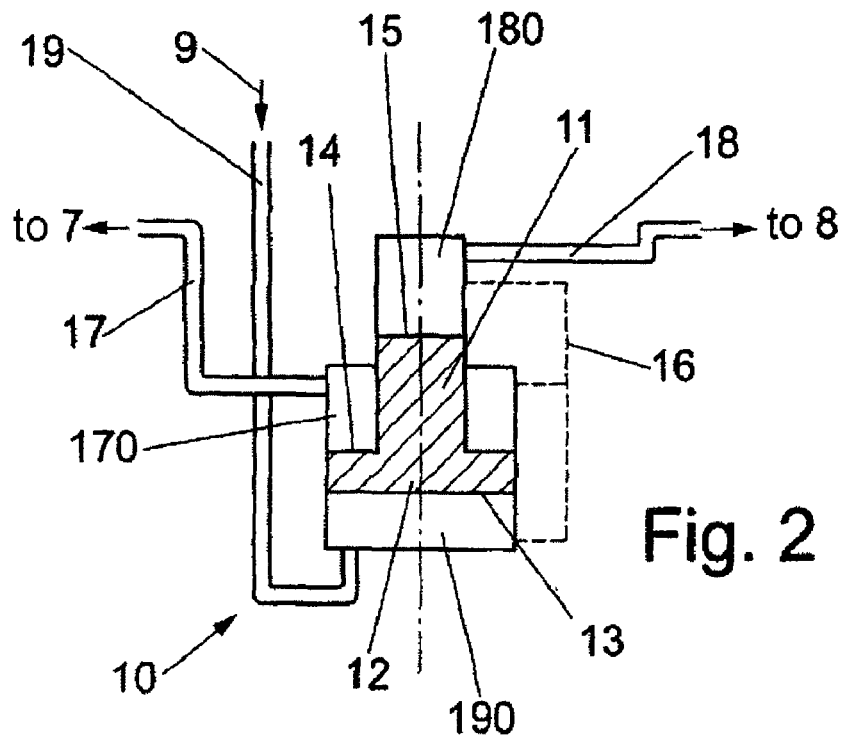
FIG. 2 is a schematic representation of a synchronization device of a second exemplary embodiment of the hydraulically actuated multi-piston disc brake according to the invention.
Figure 3:
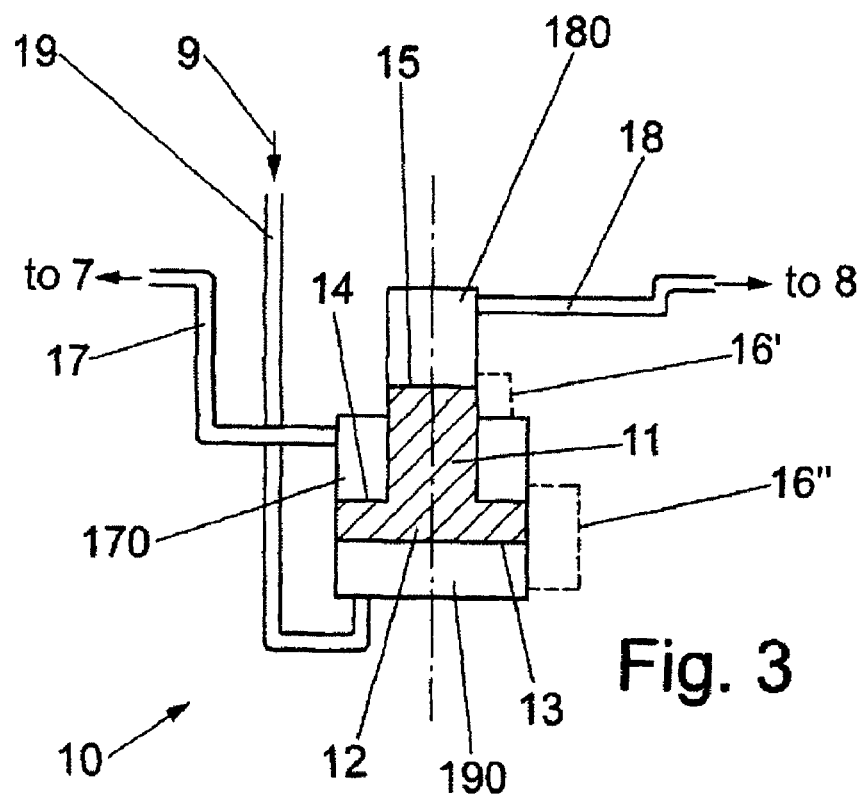
FIG. 3 is a schematic representation of a synchronization device of a third exemplary embodiment of the hydraulically actuated multi-piston disc brake according to the invention.
Figure 4:
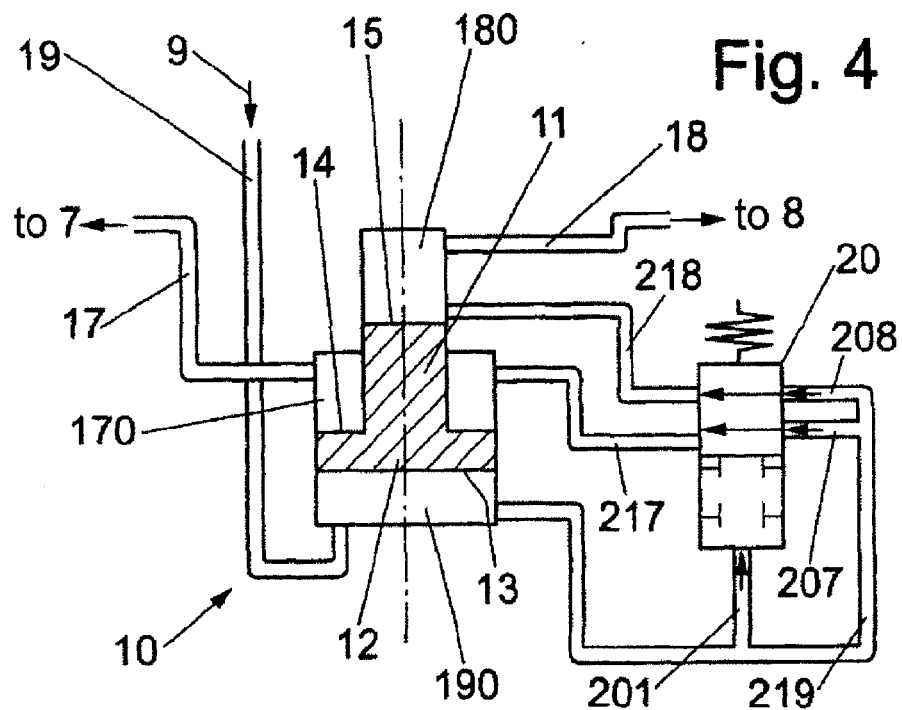
FIG. 4 is a schematic representation of a synchronization device of a fourth exemplary embodiment of the hydraulically actuated multi-piston disc brake according to the invention.

FIGS. 2 to 4 show synchronization devices of further exemplary embodiments of the hydraulically actuated multi-piston brake according to the invention.

FIG. 2 shows a schematic representation of a second exemplary embodiment of the hydraulically actuated multi-piston disc brake according to the invention. Here, the outlet pressure chambers 170 and 180 are together connected to the inlet pressure chamber 190 via a so-called leakage line 16. This constant leakage represents a simple measure and maintains the working function.

FIG. 3 shows a schematic representation of a third exemplary embodiment of the hydraulically actuated multi-piston disc brake according to the invention, a leakage occurring only in a rest position of the stepped piston 11. For this purpose, a leakage line 16' is connected to the lower section of the outlet pressure chamber 180, which is not sealed off in the rest position of the stepped piston 11 shown, and to the outlet pressure chamber 170. The lower section of the inlet pressure chamber 190 is here connected to the lower section of the outlet pressure chamber 170 by way of a further leakage line 16". This is likewise a relatively simple measure, serving to reduce the synchronization effect.

FIG. 4 shows a schematic representation of a fourth exemplary embodiment of the hydraulically actuated multi-piston disc brake according to the invention with a pressure-controlled valve 20. The inlet pressure chamber 190 is connected by way of the inlet compensation line 219, which branches into a first and second compensation line 207 and 208, to the valve 20, which includes further outlet connections via a first and second outlet compensation line 217 and 218 to the first and second outlet pressure chambers 170, 180 respectively. A control pressure line 201 for controlling the pressure-controlled valve 20 branches off from the inlet compensation line 219. The valve 20 must be kept open counter to the flow direction in order to fulfill the aforementioned functions.

Figure 5:
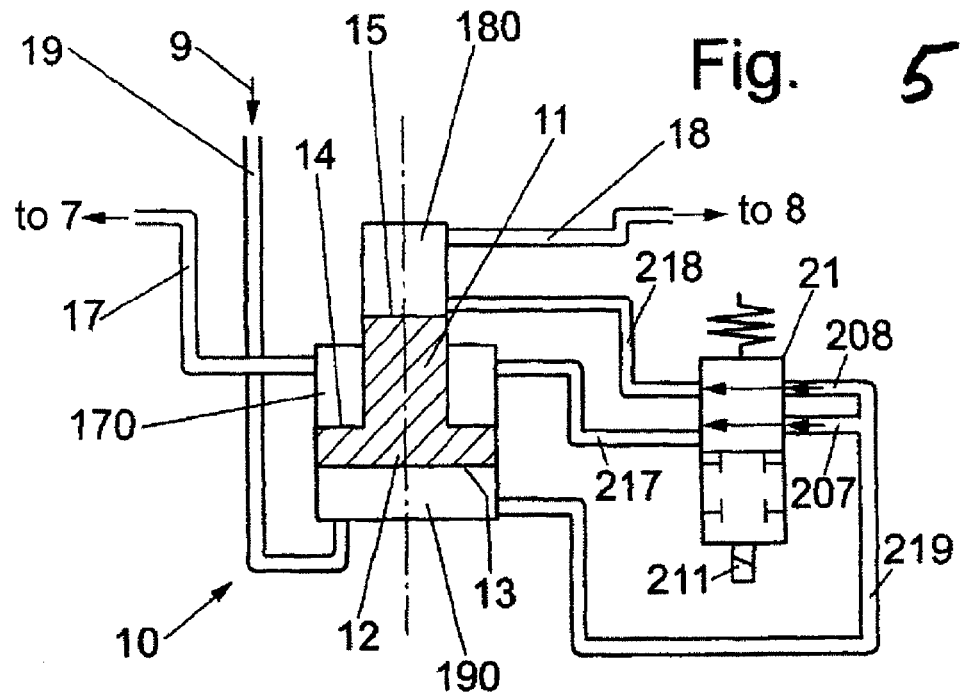
FIG. 5 is a schematic, enlarged representation of the synchronization device of the first exemplary embodiment of the hydraulically actuated multi-piston disc brake according to the invention in FIG. 1.

FIG. 5, as already described above, shows an enlarged representation of the synchronization device of the first exemplary embodiment as an especially preferred embodiment. The valve 21 is remotely controlled, which is achieved, for example, by means of a solenoid. This valve 21 has a free flow passing though it; all of the aforementioned functions are completely fulfilled. The valve 21 must be switched prior to a build-up of pressure, which can be done by a corresponding control device, which for this purpose is coupled to the brake pedal as triggering contact, for example.

In a preferred embodiment, in the first exemplary embodiment according to FIG. 1 or FIG. 5, the pressure chambers 190, 170 and 180 are controllably connected via the valve 21, thereby creating a compensatory balance in order to fulfill the functions stipulated above.

Further advantages of the invention will be described below.

Wear Adjustment or Clearance Adjustment

In the state following a change of the brake linings, the brake pistons 5, 6 are pushed back as far as the stop, with a large gap (>1 mm) between the brake pistons 5, 6 and the brake lining carrier plate 2. On actuation of the brake in this state, the brake lining carrier plates 2 with the brake lining material 3 are displaced by the amount of the gap plus the elasticity lift. But, due to the 'roll-back effect', on release they are retracted only by the amount of clearance, of up to 0.5 mm. More volume is left in the actuating cylinders and pressure chambers 7, 8, and the stepped piston 11 is pushed back less according to this volume. The stepped piston 11 will no longer reach its starting position, but will stop at more than ⅓ of its stroke.

Possible measures to remedy this are (see FIGS. 2 to 5):

a) A constant leakage between the three pressure chambers 170, 180, 190, which is designed in such a way that it will maintain this function;

b) A leakage only in the rest position of the stepped piston 11;

c) A bypass connection with pressure-controlled valves; and d) A bypass connection with remotely controlled valves.

A Brake Piston Reset Facility for Brake Servicing

The brake pistons 5, 6 are reset by pushing them back against the resistance of the piston sealing rings. A prerequisite for this is that the displaced brake fluid is able to flow back unimpeded into a reservoir of the brake system. In the absence of corresponding measures, the stepped piston 11 constitutes a barrier to the return flow, which prevents the resetting of the pistons.

Filling of the Brake System and Soft 'Knock-Back'

The lines 17, 18, 19, 217, 218, 219 preferably run inside the brake housing or caliper 1, it also being possible to it the valve 21 into the brake housing 1. For reasons of simplicity, the valve 21 is represented as a standardized circuit symbol.

The invention is not limited to the exemplary embodiments described above. It is feasible for the stepped piston 11 to be of a multi-step design for more than two brake pistons 5, 6. The synchronization device 10 may also be arranged separately on the brake housing 1.

LIST OF REFERENCE NUMERALS 1 brake housing
2 brake lining carrier
3 brake lining material plate (pad)
4 brake lining material (pad)
5 first brake piston
6 second brake piston
7 first pressure chamber
8 second pressure chamber
9 inlet pressure
10 synchronization device
11 stepped piston
12 inlet step
13 first piston face
14 second piston face
15 third piston face
16, 16', 16" leakage line
17 first outlet pressure line
18 second outlet pressure line
19 inlet pressure line
20 first valve
21 second valve
170 first outlet pressure chamber
180 second outlet pressure chamber
190 inlet pressure chamber
201 control pressure line
207 first compensation line
208 second compensation line
217 first outlet compensation line
218 second outlet compensation line
219 inlet compensation line
BS brake disc chamber The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake, comprising:
a brake housing;
at least two hydraulically actuated brake pistons operatively configured to act upon a brake lining, the two pistons being arranged in the brake housing;
a hydraulic synchronization device for reducing oblique wear of the brake lining, the hydraulic synchronization device being operatively arranged between an input pressure line for actuating the disc brake and the two hydraulically actuated brake pistons;
wherein the hydraulic synchronization device is at least partially arranged in the brake housing; and wherein the hydraulic synchronization device includes a stepped piston having a first piston face subjectable to an inlet pressure for actuating the brake and being movably arranged in an inlet pressure chamber, and at least two further piston faces, each of which generates an actuating pressure for a respective one of the two hydraulically actuated brake pistons, the two further piston faces each being movably arranged in a corresponding outlet pressure chamber.

2. The disc brake according to claim 1, wherein the corresponding outlet pressure chambers are coupled to the inlet pressure chamber.

3. The disc brake according to claim 1, wherein the corresponding outlet pressure chambers are interconnected and at least one of said corresponding outlet pressure chambers is connected to the inlet pressure chamber in a rest position of the stepped piston.

4. The disc brake according to claim 1, further comprising controllable connections operatively configured to controllably connect the corresponding outlet pressure chambers to the inlet pressure chamber.

5. The disc brake according to claim 4, wherein the controllable connections comprise at least one valve.

6. The disc brake according to claim 5, wherein the valve is a pressure-controlled valve.

7. The disc brake according to claim 6, wherein the pressure-controlled valve is controllable by the inlet pressure.

8. The disc brake according to claim 5, wherein the valve is a remotely controlled valve.

\* \* \* \* \*